Jan. 19, 1926.  
N. H. FOOKS  
1,570,235  
APPARATUS FOR HEAT TREATING SUBSTANCES PACKED IN SEALED RECEPTACLES  
Filed Dec. 8, 1924  
5 Sheets-Sheet 1

Inventor  
Nelson H. Fooks.

By Mason Fenwick & Lawrence,  
Attorneys

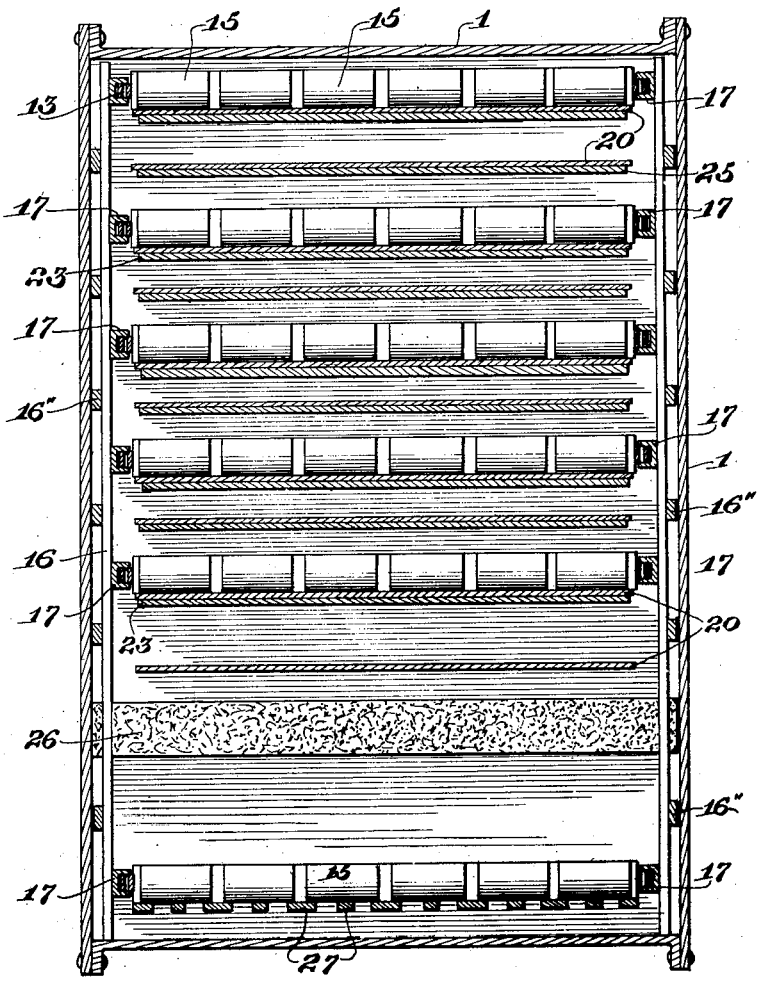

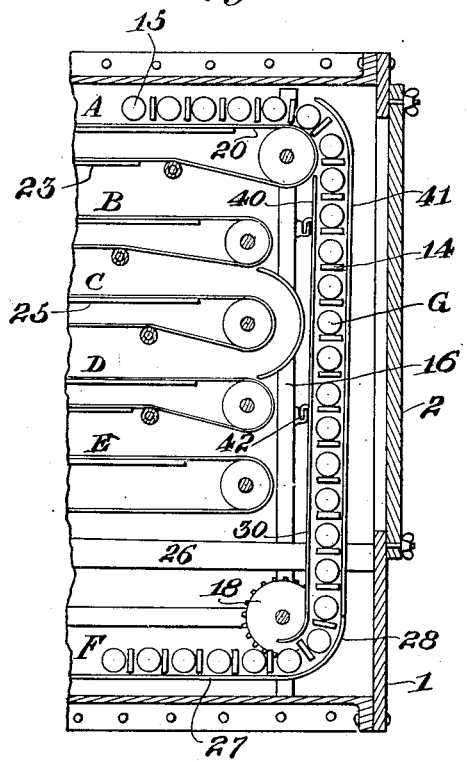
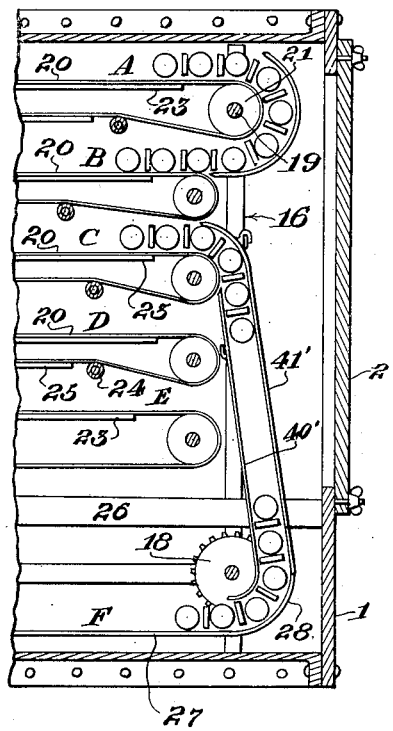
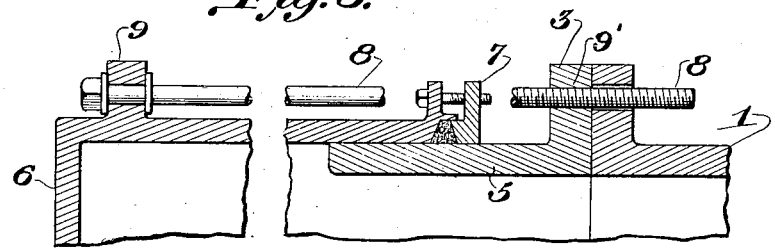
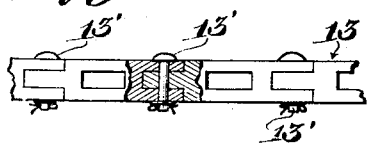

Jan. 19, 1926. 1,570,235
N. H. FOOKS
APPARATUS FOR HEAT TREATING SUBSTANCES PACKED IN SEALED RECEPTACLES
Filed Dec. 8, 1924 5 Sheets-Sheet 4
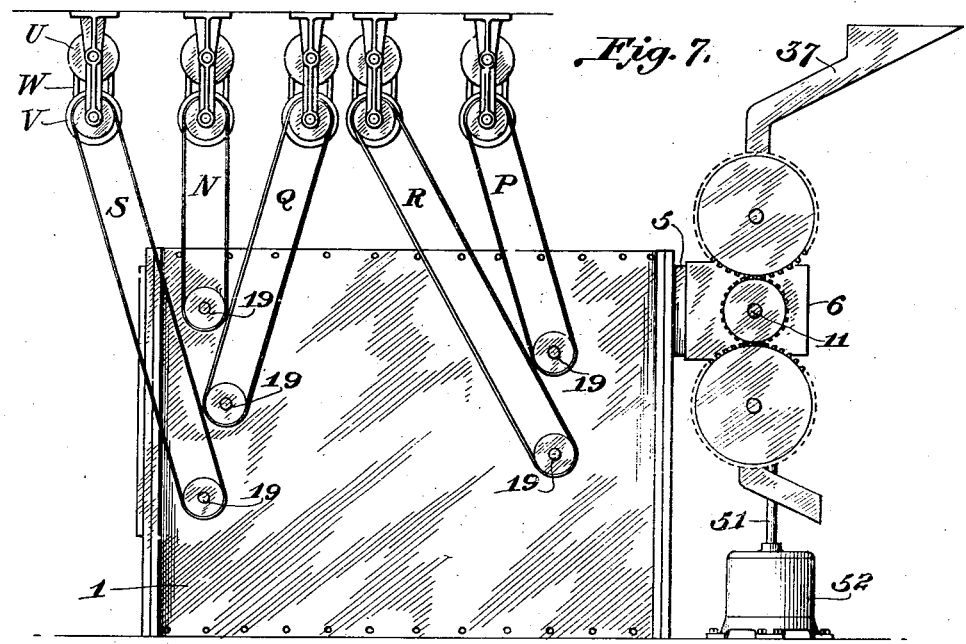
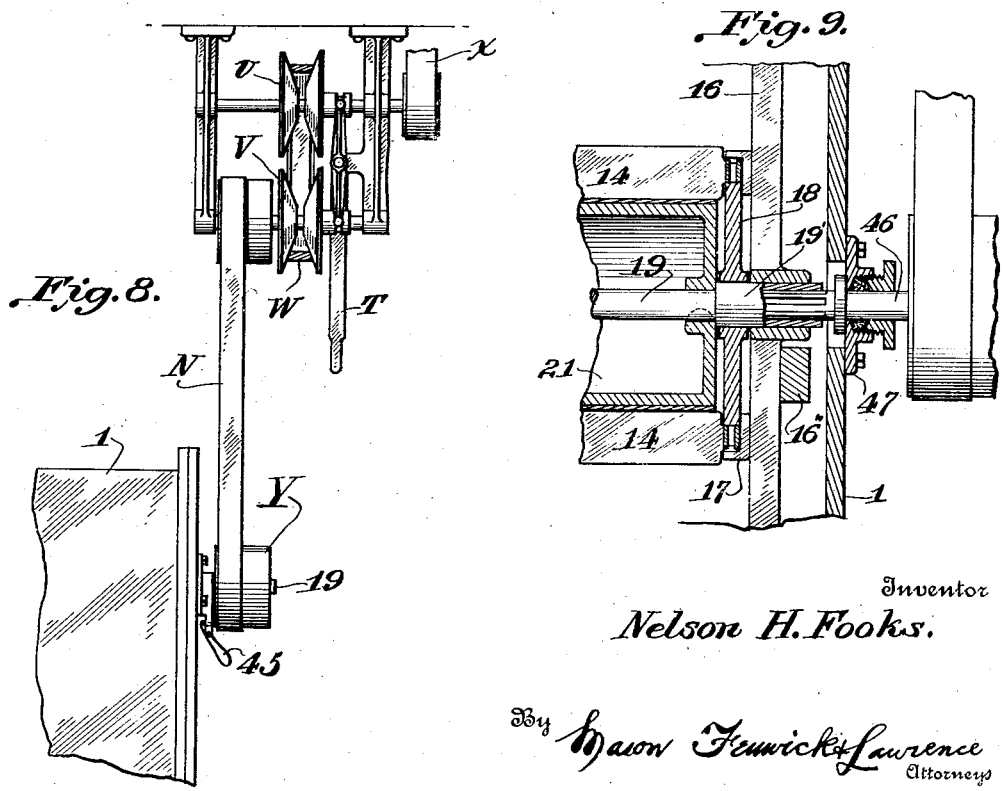
Inventor
Nelson H. Fooks.
By Mason Fenwick & Lawrence
Attorneys Jan. 19, 1926. 1,570,235
N. H. FOOKS
APPARATUS FOR HEAT TREATING SUBSTANCES PACKED IN SEALED RECEPTACLES
Filed Dec. 8, 1924 5 Sheets-Sheet 5
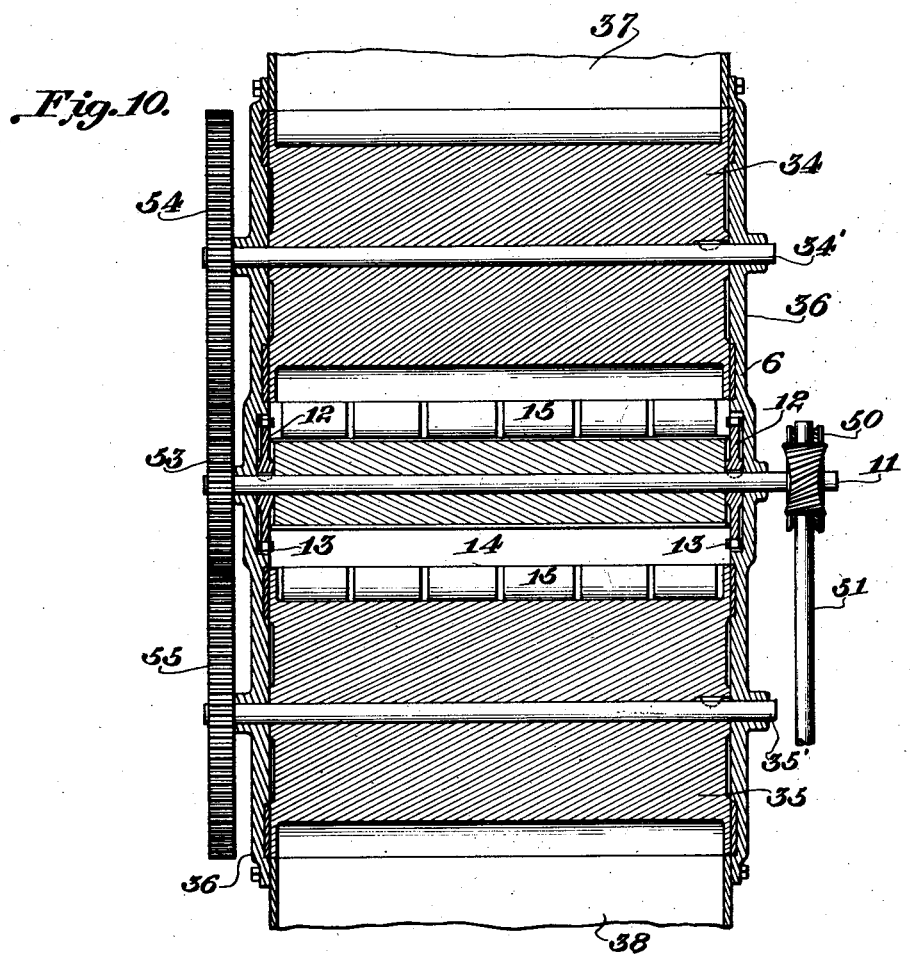
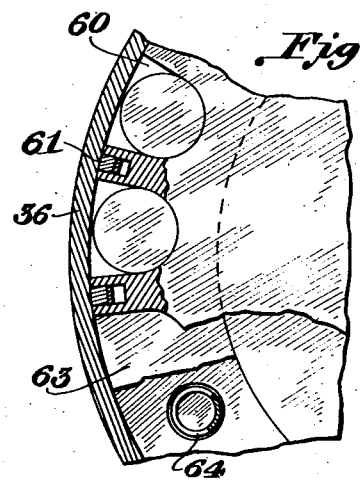
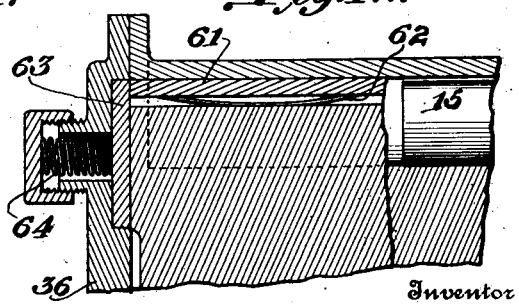
Inventor
Nelson H. Fooks.
By Mason Fenwick & Lawrence.
Attorneys Patented Jan. 19, 1926.

1,570,235

UNITED STATES PATENT OFFICE.

NELSON H. FOOKS, OF PRESTON, MARYLAND.

APPARATUS FOR HEAT-TREATING SUBSTANCES PACKED IN SEALED RECEPTACLES.

Application filed December 8, 1924. Serial No. 754,603.

*To all whom it may concern:*

Be it known that I, NELSON H. FOOKS, a citizen of the United States, residing at Preston, in the county of Caroline and State of Maryland, have invented certain new and useful Improvements in Apparatus for Heat-Treating Substances Packed in Sealed Receptacles; and I do hereby declare the following to be a full, clear, and exact description of the invention, such as will enable others skilled in the art to which it appertains to make and use the same.

It is an object of this invention to provide an apparatus whereby the contents of sealed receptacles may be subjected to the action of a cooking or sterilizing temperature for varying periods of time, and after being cooked or sterilized may be cooled before being discharged into the atmosphere, the cooking and cooling being effected within a single tank.

The apparatus includes a tank having an endless conveyer arranged therein for progressing cans therethrough along a circuitous path part of which includes horizontal levels, means being provided for supporting the cans while they are being progressed along said levels. In heat treating food substances it may be desirable to allow or not to allow the receptacles to be agitated as by rolling or turning about their axes while they are being progressed. My improved apparatus is constructed with a view to permit or prevent the rotation of the cans or receptacles during their period of heat treatment and to that end the said means for supporting the cans constitute endless belts which are adapted to be driven at variable speeds independently of each other, the arrangement and construction being such that the cans being progressed by the conveyer may or may not be permitted to roll while they are being progressed through the tank.

It is also an object of the invention to provide means which will enable the heating period to be shortened. For effecting this purpose the invention contemplates the shortening of the path of the can-conveyer in a manner hereinafter appearing.

It is also an object of the invention to provide an apparatus for the purpose indicated which will permit the framework and mechanism associated therewith to be withdrawn from the tank as a unit in case it is necessary to effect repairs and the invention further contemplates the provision of means for enabling the can-conveyer to be suitably tensioned.

The invention is also concerned with a method for heat treating substances packed in sealed containers, said method including the continuous cooking and cooling of the contents of sealed receptacles by feeding them to an endless conveyer which is arranged in the circuitous path within the tank or retort, the cans after being subjected to a sterilizing or cooking temperature being passed through a cooling medium before being discharged from the tank.

The various features of novelty and invention will appear from the detailed description taken in connection with the accompanying drawings forming part of the specification.

Referring to the drawings:

Figure 1 is a vertical sectional view taken through the combined cooker and cooler, Figure 2 is a transverse section on line 2—2 of Figure 1, Figure 3 is a vertical sectional view of one end of the apparatus illustrated in Figure 1, showing the conveyer chain as passing directly from the upper run to the lower run, thereby cutting out the intermediate loops to shorten the can path in the tank, Figure 4 is a view similar to Figure 3, showing how the can path may be increased over that shown in Figure 3, but may be shorter than that shown in Figure 1, by cutting out only part of the intermediate loops of the can-conveyer, Figure 5 is a fragmentary sectional view showing the manner of adjusting the telescopic sections for taking up the slack in the can-conveyer, said sections being shown in Figure 1 in connection with the mechanism for feeding and discharging cans to and from the conveyer, Figure 6 is a fragmentary view showing means which will permit the conveyer to be readily severed, Figure 7 is a side elevation of the layout for driving the operating mechanism of the apparatus, Figure 8 is a detail view of a variable speed drive which may be employed in connection with the apparatus, Figure 9 is a detailed sectional view showing one manner of coupling a belt drum to a stub shaft to permit the latter to be disconnected from said drum.

Figure 10 is a sectional view taken on line 10—10 of Figure 1, and

Figures 11 and 12 are fragmentary detailed views of the rotary valves shown in Figures 1 and 10.

Figure 1:
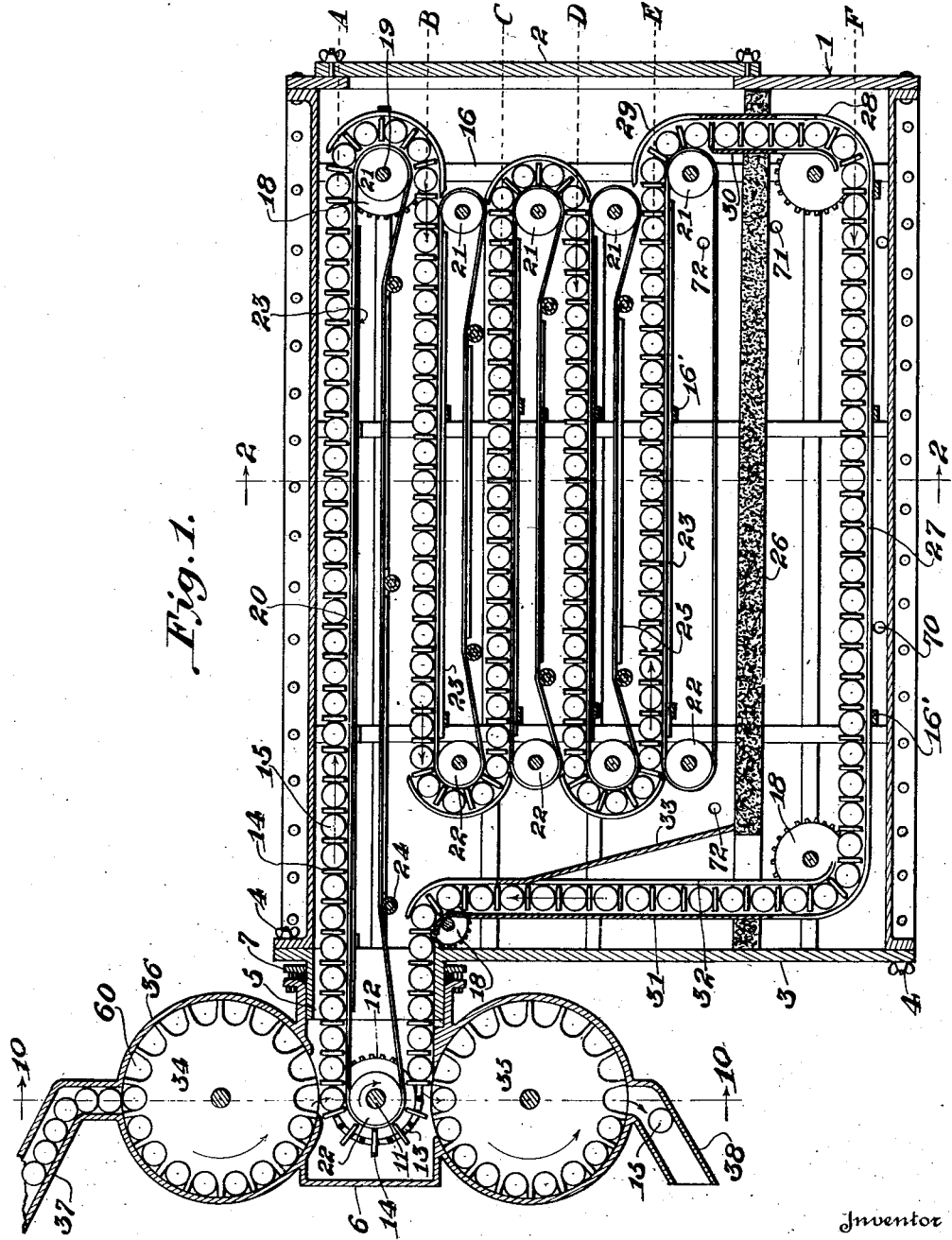

In the drawings numeral 1 indicates a closed tank having a removable cover 2 at one end thereof to permit inspection of the mechanism within the tank. The other end of the tank is closed by a plate 3, removably secured to the tank in any suitable manner, as by securing means 4. This plate 3 is provided near its top with a sleeve or extension 5, over which is telescoped a casing 6, suitable packing means 7 being provided to maintain a fluid-tight joint between the telescopic members. The casing 6 is adapted to be adjusted on the sleeve or extension 5 and such adjusting means preferably takes the form of a plurality of screw bolts 8, suitably mounted as in perforated lugs 9 on the casing 6 and threadedly connected with the flange or rim of the plate 3 as indicated at 9', Figure 5. It will now be seen that upon turning of the screw bolts 8 a relative movement may be had between the casing 6 and the sleeve 5. Mounted across the casing 6 is a shaft 11 and keyed to this shaft is a pair of sprocket wheels 12, a wheel at each end of the shaft (see Fig. 10). Cooperating with these sprocket wheels are chains 13 forming part of the can-conveyer, said chains being shown in larger scale in Figure 6. As will be noted from Figure 1 the can-conveyer is an endless member and is arranged in loops within the tank to form a circuitous path for the cans. It will now be appreciated that the conveyer may be suitably tensioned by adjusting the casing 6 on the sleeve 5 projecting from the plate 3 forming part of the tank. Extending between the chains 13 are paddles 14, it being understood that cans or receptacles 15 are adapted to be positioned between any two paddles for the purpose of being progressed by the conveyer of which the said paddles are a part.

Within the tank is a suitable framework generally indicated at 16, the same being suitably braced to form a rigid structure which may be withdrawn from the tank, as will more fully appear hereinafter. Supported by the framework 16 is a channeled track 17 within which the conveyer chains 13 are slidably received, said tracks being arranged in a regular zig-zag or circuitous path whereby the conveyer will be similarly arranged as clearly indicated in Figure 1. It will be noted that the tracks are so arranged that the conveyer will travel through different levels. For convenience of description the various levels reading from the top to the bottom may be identified by reference characters A, B, C, D, E, and F.

In order to prevent binding of the conveyer chains at the loops there may be provided sprocket wheels 18, some of which may be idle and some of which may be driven. In Figure 9 the sprocket wheel 18 is shown as being mounted loose on a shaft 19 which is suitably supported in the framework 16.

Each of the levels A, B, C, D and E of the conveyer has associated therewith a can-supporting platform in the form of an endless belt 20. Each of these endless belts is looped around drums 21 and 22, the drums being mounted on suitable shafts similar to the shaft 19, see Fig. 9.

It will be remembered that the conveyer is made up of paddles 14 which extend between the sprocket chains 13, the paddles being arranged in spaced parallel relation on the chains. The conveyer is therefore of open construction and unless some means are provided to hold the cans in place between the paddles they would obviously drop away from the conveyer. The upper runs of the endless belts therefore serve as supporting platforms to prevent the cans from dropping away from the conveyer. There is preferably associated with the upper run of each of the said belts 20 a non-flexible platform generally indicated at 23. These non-flexible platforms 23 obviously serve to prevent the upper run of the belt from sagging and maintain the same parallel to the levels of the conveyer. In order to prevent the lower run of the endless belts 20 from contacting with the level of conveyer thereunder said run is preferably guided over rollers 24 arranged in a plane above the adjacent levels of the can-conveyer. In order to reduce the number of rollers there may be provided a non-yielding guide 25 between the rollers 24 which will prevent the lower run of the belts from contacting with the underlying conveyer level, as will be readily understood.

The endless belts are adapted to be independently driven at variable speeds or to be held stationary as will presently appear.

Mounted on the framework 16 in spaced relation to the bottom of the tank is a partition 26 having openings at each end through which the conveyer extends. The space between the bottom of the tank and the said partition is adapted to contain a cooling medium such as water. The partition is preferably made of some insulated material to prevent the exchange of heat between the cooling chamber and the heating chamber thereabove. Arranged below the bottom level F of the conveyer is a non-flexible platform 27 which prevents the cans from dropping away from the conveyer, said platform extending upwardly as at 28, a member 29 being provided as a continuation of said member 28 to constitute one side of a well or guard for the cans on the conveyer. Disposed on the other side of the conveyer is a guard member 30 which with the other guard member constitutes the said well. At the other end of the tank the platform 27 is continued upwardly as at 31 to constitute with a parallel guard member 32 a well through which the conveyer chain passes, the members 31 and 32 preventing the cans from rolling off the conveyer, said members at their tops being curved to correspond with the curvature of the loop of the conveyer where it passes into the sleeve 5 and casing 6. A baffle plate 33 is preferably provided between the partition 26 and the upper end of the guard member 32 to prevent the heating medium from passing into the cooling chamber below the partition 26, and to prevent cooling water carried up by the cans from falling on top of the partition.

Associated with the casing 6 is a pair of trap valves 34 and 35 for feeding cans to and discharging them from the conveyer. These valves are enclosed in suitable casings 36, shown as forming part of the casing 6. The trap valve 34 feeds cans to the conveyer from a source of supply 37 and the trap 35 receives the cans from the conveyer and discharges them through a chute 38.

At this point it may be pointed out that the framework 16 and all the mechanism associated therewith may be withdrawn from the tank by merely releasing the securing means 4 of the end wall or plate 3, after which the framework may be drawn out of the tank for inspection or repair. It will, of course, be understood that the end wall 3 will be removed as a unit with the frame 16. This is a valuable feature of the invention inasmuch as it not infrequently happens that the conveyer or other mechanism becomes broken or disarranged, due to jamming of the cans. It will be readily appreciated that an apparatus which permits the framework on which the moving parts are supported to be withdrawn as a unit from the tank is a very valuable feature, because it enables repairs to be effected in the open and with great expedition. In Fig. 1 some of the transverse bracing of the framework 16 is indicated at 16'; in Fig. 2 some of the longitudinally extending braces are indicated at 16".

As is well known in the art, some food substances require a longer period of heat treatment than others. Various forms of apparatus have been suggested for discharging the cans from the retort at some intermediate point in the can path. In such apparatus however the cooling of the cans prior to their discharge from said point has not been attempted. As already indicated, my method of heat treatment of the cans includes the cooling of the same before discharge from the tank. In my improved apparatus I propose to vary the cooking period by cutting out a portion of the can path, such cutting out being effected by shortening the length of the conveyer. As indicated in Figure 6, the chains 13 of the conveyer are provided with removable pins 13'. Referring to Fig. 3, if it is desired to pass the cans directly from the upper run A to the lower run F in the cooling chamber, the requisite amount of conveyer chain is cut out and the conveyer coupled up, as in Fig. 3. The cutting out of a section of conveyer is readily effected by cutting out the requisite amount of chain 13 between any two given pins 13', as will now be readily understood. The cut out section of conveyer is preferably allowed to remain in position as formerly. For convenience of illustration said cut out or idle section of conveyer has been omitted from Figs. 3 and 4. The shortened can path between the top and bottom runs A and F will hereinafter be referred to as the path G. In order to prevent the cans from rolling off the paddles on the vertical run, or path G, inner and outer guards 40 and 41 are provided. The inner guard 40 is removably positioned on the framework 16 in any suitable manner, as for example, by interlocking hook members generally indicated at 42, and is positioned on the frame 16 before the ends of the severed conveyer are connected to form the can path G. The guard member 41 is suitably positioned on the framework 16 by means not shown, it being understood that the guard member 29, shown in Fig. 1, is first removed to permit the placement of the guard member 41. Said guard members 40 and 41 obviously constitute a well within which the conveyer travels, and within which the cans or receptacles are confined on the conveyer.

If a longer cooking period is required than would be given by transferring the cans directly from the upper run A to the lower run F, as described, such longer period may be obtained by transferring the cans from the conveyer level C, as indicated at Fig. 4, it being understood that the mode of operation of cutting out a section of the conveyer is the same as that previously described in connection with Fig. 3. The inner and outer guard members will be correspondingly shortened, as indicated at 40' and 41'.

The above described manner of shortening the cooking period by cutting out sections of the can-conveyer may obviously be practiced in connection with an apparatus having more loops of the conveyer than that illustrated in the present drawings. The apparatus as illustrated provides for three distinct cooking periods, namely: that given by the maximum length of can path shown in Fig. 1, the minimum can path shown in Fig. 3, and the intermediate can path as shown in Fig. 4.

As previously indicated above, the endless belts 20 may be independently driven at variable speeds or need not be driven, as circumstances may require.

A simple layout for driving the endless belts is shown in Fig. 7. The driving belts N, P, Q, R and S, belong respectively to the platform belts 20, associated with the can-conveyer levels A, B, C, D and E, respectively. The various platform belts are driven at alternate ends in order to simplify the belt driving layout.

Any suitable form of variable speed drive for the platform belts may be employed, a conventional form being illustrated in Fig. 8, reference character T indicating the handle for varying the diameter of the driving pulleys U and V, the belt between said pulleys being indicated at W, and the power belt for driving the pulleys being indicated at X.

In order to hold the platform belts 20 stationary any suitable locking means as generally indicated at 45, Fig. 8, is provided. The means shown comprise a handle having a pin or stop for engagement with the pulley Y on the shaft 19. It is desirable to provide said locking means 45 to prevent the platform belts 20 from being moved by the friction of the cans thereon as they are being progressed by the conveyer. It will now be seen that the various platform belts 20 may be driven independently of each other at variable speeds, or may be held from rotation as the case may be, by the mechanism described.

The shaft 19 includes a stub shaft 46, as shown in Fig. 9, the shaft 46 being removably and non-rotatably coupled to the main shaft 19, the latter being shown as having an enlarged socket 19' within which the splined end of the stub shaft 46 is received. The enlarged part 19' of the shaft 19 is suitably supported in a bearing formed in the frame 16. The shaft 46 extends through a fluid-tight packing through the wall of the tank 1, the packing box being generally indicated at 47.

The purpose of providing the shaft 19 with a removable stub shaft 46 is to permit the stub shaft 46 to be withdrawn from the shaft 19, so that the frame or framework 16 can be withdrawn from the tank, as previously explained. In uncoupling the stub shaft from the shaft 19 the packing box 47 is detached from the wall of the tank.

The can-conveyer is driven by any suitable mechanism, Figs. 7 and 10 indicating one manner of driving the conveyer and also the trap valves 34 and 35. The shaft 11 on which the sprocket wheels 12 are keyed, as shown, is provided with a worm wheel 50 in mesh with a worm on the shaft 51, extending from an electric motor 52. The other end of the shaft 11 is provided with a gear 53 which meshes with gears 54 and 55, mounted on the shafts on which the trap valves 34 and 35 are mounted, said shafts being indicated at 34' and 35', respectively.

Inasmuch as the trap valves and conveyer are intergeared, there is obtained the necessary synchronization between the trap valves and the conveyer, as will be readily understood.

The trap valves are so constructed that cans may be trapped into and out of the tank 1 with minimum leakage of heating medium or pressure within the tank. The valves are shown in the nature of drums having a series of can pockets 60, the pockets being separated by packing bars 61 maintained in fluid-tight relation to the interior wall of the casing 36 by means of springs 62. The packing bars 61 are of greater length than the openings, through which the cans pass to and from said valves, in order to hold the packing bars in place, as will be readily understood. In order to prevent leakage of heating medium or pressure at the ends of the valves there is provided a circular packing ring 63 at each end of the valve, said ring being held in close contact with the valve by means of coil springs 64 mounted in suitable housings in the side walls of the valve casings or housings 36, as clearly indicated in Fig. 12. The valve construction need not be further described, as it forms no part of the present invention.

The cooling water is entered into the tank through a suitable conduit 70, there being also provided an overflow conduit 71 immediately below the partition 26. The cooling water is allowed to flow into the tank continuously in order to maintain a desired temperature of the cooling medium, the desired level of cooling medium being determined by the overflow 71. The heating medium is entered into the tank through a plurality of conduits 72, as shown in Fig. 1. The heating medium will preferably be steam maintained under suitable pressure to give a desired cooking or sterilizing temperature. While I have shown an insulated partition 26 as located above the body of the cooling liquid, it is within the spirit of the invention to omit the said partition, inasmuch as I have found that cooking and cooling can be continuously carried on without any such structure, the exchange of heat between steam and water not being sufficient to prevent successful operation of the method and apparatus. It will be further understood that the apparatus is primarily designed as a pressure cooking and cooling device. The cooling of the cans is necessary or desirable in order to reduce the internal pressure of the cans before they are discharged into the atmosphere. By cooling the cans is not meant that the cans need be cooled to the temperature of the exterior atmosphere, but merely that they will be cooled a given number of degrees below the sterilizing temperature. The reduction of temperature thus effected in cooling will be sufficient to reduce the internal pressure to a point which can be readily withstood by the cans when discharged.

The mode of operation will be readily understood from the above description, but attention may again be called to the fact that the cans pass through a definite path to permit their being properly cooked or sterilized, and after such sterilization pass through a cooling medium and thence out into the atmosphere. The cooking period may be varied by changing the effective length of the can path.

It is to be further understood that in the drawings no attempt has been made to show the particular type of belt 20 which may be employed. Said belts may be of any suitable or preferred construction, for example a metallic belt of open construction, as a mesh belt. It may be further pointed out that the members around which the said belts 20 are looped will be adapted to the particular type of belt employed, being drums or sprockets as the particular type of belts may require.

As already indicated, the can-conveyer is made up of a pair of endless chains which support paddles or pusher bars 14, arranged in uniformly spaced parallel relation across the chains. The space between a pair of pusher bars constitutes a compartment between which the cans may be received in recumbent axially lined position, it being understood that the cans are fed to the conveyer in axially lined groups and are also discharged from the conveyer through the valve 35 in a similar condition.

When there is relative movement between the can-conveyer and the underlying endless belt which supports the cans, the frictional resistance between the cans and the supporting belt is sufficient to cause the cans to rotate about their axes as they are being moved or progressed by the conveyer. In certain classes of goods, such as peas, the agitation imparted to the goods by the rotation of the cans, as stated, is very objectionable inasmuch as such agitation tends to crush the goods and reduce them to a more or less pulpy mass. By moving the belts at the same linear rate of speed as the conveyer the cans do not rotate about their axes while being moved by the conveyer. By providing means which will enable the belts to be driven at variable speeds with respect to the conveyer such classes of substances or goods which are advantageously agitated may be agitated by rotation of their containers or cans to any desired degree. It will be appreciated that the greater the relative degree of movement between the conveyer and the underlying can supporting the belt, the greater will be the rotative movement of the cans. The required amount of agitation or rotative movement of the cans about their axes will ordinarily be obtained by holding the can-supporting belts 20 stationary, but if greater agitation or rotation of the cans is desired than that afforded by holding the said belts stationary, the belts may be driven in a direction opposite from that to which the conveyer is moving, as will be readily understood. The drawings do not show the lowermost horizontally disposed section of the conveyer as being provided with a movable platform or belt but it is obviously within the scope of the invention to provide such a movable platform or belt so that the cans may be prevented from rotation throughout practically their entire course of movement through the tank.

As previously indicated the cooking or sterilizing of the contents of the cans or receptacles is preferably effected under high temperatures and pressure and the tank or shell is therefore constructed to withstand internal pressure.

It is obvious that various details of construction may be varied without departing from the spirit of the invention and reference is therefore to be had to the appended claims for the various constructional features sought to be protected by Letters Patent.

What I claim is:

1. The combination of a tank, an endless conveyer arranged therein for progressing cans therethrough along a circuitous path part of which includes horizontal levels, means for supporting the cans while they are being progressed along said levels, means for moving said last named means whereby the cans may be progressed by said conveyer with or without rotary motion about their axes, and means for feeding cans to and discharging them from the conveyer.

2. The combination of a tank, a plurality of endless belts disposed transversely at different levels therein, an endless can-conveyer having portions of its length disposed in parallel relation to the upper runs of said belts and being open on its bottom whereby the cans progressed thereby may rest on the upper runs of said belts, means for driving said belts at variable speeds independently of said conveyer whereby the cans resting on said belts may be progressed with or without rotation about their axes, and means for feeding and discharging cans to and from said conveyer.

3. The combination of a tank, can supporting platforms disposed transversely at different levels therein, an endless can-conveyer having portions of its length disposed in parallel relation to said platforms, means for shortening the path of travel of the cans comprising means for cutting out portions of said conveyer and associated platforms, and means for guiding the cans along the shortened path.

4. The combination of a tank, an endless can-conveyer arranged in loops therein, means for supporting the cans between the looped ends of the conveyer, means for cutting out a section of conveyer to shorten the can path, and means extending between a pair of looped ends of the conveyer for retaining the cans in place on the conveyer along the shortened path.

5. The combination of a tank, an endless can-conveyer arranged in loops therein, said conveyer comprising a pair of spaced endless members across which extend spaced parallel bars for pushing cans placed in front thereof, means for supporting the cans between the loops of the conveyer, means at each loop of the conveyer for holding the cans in place between said bars while the conveyer is making the loop, means for passing the cans between a pair of loops at the same end of the tank comprising means for cutting out that section of conveyer between the said pair of loops, and means for retaining the cans on the conveyer along that section of the same extending between said pair of loops.

6. The combination with a tank, of an endless conveyer arranged in a circuitous path therein, a telescopic outside extension on said tank into which said conveyer extends and within which it is supported in looped position, means for shifting the movable element of said extension to suitably tension the conveyer, and means carried by said movable element for feeding cans to and discharging them from the conveyer.

7. The combination with a tank, of a framework within the tank adapted to be withdrawn therefrom, a cover plate removably secured to one end of the tank, an outwardly extending casing on said cover plate, a rotatable shaft member within said casing, an endless can-conveyer looped about said shaft member and supported in loops on said framework, means supported by said casing for feeding cans to and from said conveyer, said cover plate upon being loosened from the tank permitting the said framework and conveyer to be withdrawn from the tank, and means for varying the relative distance between said shaft member and the framework within the tank whereby the conveyer may be suitably tensioned.

8. In combination, a framework, a plurality of endless belts supported in spaced relation thereon, the upper run of said belts constituting supporting platforms for cans, an endless conveyer having portions of its length disposed in parallel relation over said runs, rotatable means about which said belts are looped, a tank within which said framework is contained, stub shafts extending through the tank wall and connected to said rotatable means for driving the same, and said framework adapted to be removed from said tank upon disconnecting said stub shafts from said rotatable means.

9. In combination, a tank, an endless can-conveyer mounted therein and having a portion of its length extending along the bottom of the tank, a partition extending across the tank above the said portion of conveyer whereby a chamber is formed between the partition and bottom of the tank, the conveyer leading through said partition at the ends thereof, the conveyer above said partition being arranged in transversely disposed loops, means for conducting a cooling liquid into the said chamber, means for conducting a heating medium into that portion of the tank above said partition, means for feeding and discharging cans to and from said conveyer, and means for cutting out some of the loops of conveyer to shorten the path of the cans.

10. In a device of the character described, the combination of a conveyer including a pair of endless chains, sprocket wheels around which portions of said chains are looped, a shaft for supporting said wheels in pairs, a drum affixed on said shaft between said chains, an endless belt looped about said drum, and means for rotating said shaft.

11. In a device of the character described, the combination of a tank, a framework within the tank, a shaft supported by said framework, a drum affixed on said shaft, a sprocket wheel mounted loose on said shaft at each end of the drum, endless chains in mesh with said sprocket wheels, an endless belt looped about said drum and a removable shaft extending through the wall of the tank and interlocked with said shaft for driving the latter.

12. In a device of the character described, the combination of a tank, a framework removably positioned in the tank, a plurality of shafts supported by said framework, a can-conveyer, a plurality of endless belts, means on said shafts for supporting said belts and portions of the can-conveyer, means for driving said can-conveyer and belts independently of each other, and means for holding said belts from movement when the driving means for the same are not effective.

13. In a device of the character described, the combination of a framework, an endless conveyer supported thereon in looped position at different levels, means permitting the conveyer to be severed and connected to or tend direct from one loop terminal to another, and guards removably positioned on the framework between said loop terminals, said guards constituting a well through which the conveyer is adapted to pass from said loop terminals, whereby cans being progressed by the conveyer within said well are held in place on the conveyer.

14. In a device of the character described, the combination of a framework, an endless conveyer supported thereon in looped position at different levels, means permitting the conveyer to be severed and connected to extend direct from one loop terminal to another, guards removably positioned on the framework between said loop terminals, said guards constituting a well through which the conveyer is adapted to pass from said loop terminals, whereby cans being progressed by the conveyer within said well are held in place on the conveyer, and a tank within which the framework is positioned, that end of the tank adjacent said guards having a removable cover permitting access to said guards.

15. In a device of the character described, means for advancing recumbent cans, independent means for supporting the cans, and means for advancing the supporting means whereby the rotation of the cans can be controlled.

16. In combination, a can conveyer having spaced pusher members between which cans may be positioned end to end, and means capable of movement independently of the conveyer for supporting the cans in position between said pusher members, said means when moved at the same linear rate as the conveyer supporting the cans without rotation.

17. In combination, a can conveyer having a portion disposed in a horizontal position, said conveyer having transversely extending pusher members arranged in spaced relation to form can receiving compartments within which the cans may be disposed in recumbent axially lined position, a belt arranged in close parallel relation to the said horizontally disposed portion of conveyer whereby the cans between said pusher bars may rest on said belt, and means for independently moving said belt whereby the rotative movement of the cans may be controlled.

18. In combination, a closed shell or tank adapted to withstand internal fluid pressure, a can conveyer arranged within the shell in a zig-zag path, selected portions of the conveyer being arranged in horizontal paths, said conveyer having spaced transversely extending pusher bars between which cans are adapted to be placed in recumbent position, a belt disposed in close parallel relation below a horizontally arranged portion of the said conveyer for supporting the recumbent cans, means permitting the belt to be moved independently of the conveyer at variable speeds whereby rotative movement of the cans about their axes may be controlled, and means for feeding cans to and discharging them from the conveyer.

In testimony whereof I affix my signature.

NELSON H. FOOKS.